United States Patent [19]
Cobb, Jr.

[11] Patent Number: 5,641,173
[45] Date of Patent: Jun. 24, 1997

[54] CYCLING TRAILER

[76] Inventor: William T. Cobb, Jr., 11901 4th St., N., #715, St. Petersburg, Fla. 33716

[21] Appl. No.: 425,862

[22] Filed: Apr. 20, 1995

[51] Int. Cl.⁶ ............... B62K 27/00; B60D 1/01; B62J 7/04
[52] U.S. Cl. ............... 280/204; 280/292; 280/494; 280/496; 280/498; 280/491.5
[58] Field of Search ............... 280/204, 292, 280/491.5, 491.4, 494, 495, 496, 498; 70/233; 403/385, 49

[56] References Cited

U.S. PATENT DOCUMENTS

| | | | |
|---|---|---|---|
| 2,853,324 | 9/1958 | Neidmann | 403/385 |
| 3,810,704 | 5/1974 | Lowe | 403/385 |
| 3,829,125 | 8/1974 | Davis | 280/204 |
| 3,877,723 | 4/1975 | Fahey et al. | 280/204 |
| 4,266,793 | 5/1981 | Pryor | 280/204 |
| 4,413,835 | 11/1983 | Hazelett | 280/204 |
| 4,756,541 | 7/1988 | Albitre | 280/204 |
| 5,040,916 | 8/1991 | Morgan | 404/49 X |
| 5,076,600 | 12/1991 | Fake | 280/204 |

FOREIGN PATENT DOCUMENTS

| | | | |
|---|---|---|---|
| 0794900 | 2/1936 | France | 280/204 |
| 0110030 | 5/1925 | Switzerland | 280/204 |
| 0218560 | 4/1942 | Switzerland | 280/292 |
| 0572687 | 10/1945 | United Kingdom | 280/292 |

*Primary Examiner*—Anne Marie Boehler
*Assistant Examiner*—F. Zeender

[57] ABSTRACT

A light weight aerodynamically efficient cycling trailer having a single wheel is provided for towing behind a bicycle or motor cycle. The disclosed cycling trailer includes a body enclosure, an overlying lid, a light weight frame, the first end of the frame bending upwardly along the forward surface of the body enclosure to engage with a removable goose-neck tongue, the goose-neck tongue extending upwards along and attaching to the forward surface of the body enclosure, the forward end of the goose-neck tongue extending over the rear wheel of the bicycle and being coupled to a latching universal joint which couples the cycling trailer to the bicycle. The latching universal joint facilitates the easy connecting and disconnecting of the cycling trailer to a bicycle without the need of additional attachments. The cycling trailer is also provided with a removable child carrier, a hanging bar and a cargo shelf.

14 Claims, 6 Drawing Sheets

CYCLING TRAILER

BACKGROUND OF INVENTION

1. Field of the Invention

This invention relates to the field of cycling trailers, and more specifically to cycling trailers having a single wheel for being pulled behind a bicycle or motorcycle.

2. Description of the Background Art

Cycling trailers are used for carrying cargo and or small children while using a bicycle or motorcycle. Cycling trailers can be used for various transportation tasks such as shopping, touring, trail riding or camping. In addition, single wheeled cycling trailers are preferred for their light weight efficient operation. The design of some single wheeled cycling trailers is taught by the prior art. Various forms of single wheeled cycling trailers can be seen as taught in U.S. Pat. Nos. 4,325,564, 4,413,835, 4,756,541 and 5,076,600.

However, the previously known forms of single wheeled cycling trailers do not include the specific structural features or improvements as are in the present invention that give rise to advantages in operation and practical utility.

For a cycling trailer to be of practical use, the cycling trailer must offer little resistance to the cyclist during operation. To offer little resistance, the cycling trailer should be designed for low rolling resistance and preferably low aerodynamic drag. Cycling trailers of the prior art having a single wheel reduce the rolling resistance of the cycling trailer by providing low weight but do not address the subject of aerodynamic drag.

To further provide for practical use, a cycling trailer should provide a means for protecting cargo from common hazards associated with normal use. Some of the common hazards associated with normal use include inclement weather, damage due to debris and grime, damage from brush when used in off road operation, crushing of cargo by other packages and theft of cargo when cycle is unattended. Many of the prior art trailers are substantially heavier and have a much higher rolling resistance. With the addition of an enclosure to the prior art, the weight and rolling resistance of the overall trailer would only increase. An increase in rolling resistance results in an inefficient cycling trailer which resultingly requires more effort from the user.

Another problem with the prior art cycling trailers is that they do not easily attach and detach from the bicycle. The cycling trailers of the prior art have permanent or semi-permanent attachments which are to be placed on the cycle itself. The cycling trailer is then coupled in some manner to the permanent or semi-permanent attachment on the cycle. Thus, an attachment of some sort is always on the cycle even when a cycling trailer is not attached. The prior art cycling trailers also require the use of tools in order to attach them to and detach them from the cycle. Requiring additional tools and multiple parts to assemble when attaching the cycling trailer to the cycle detracts substantially from its ease of use. Preferably, the attaching and detaching of the cycling trailer should be easily accomplished without the use of tools, as in the present invention, with a quick release action. Therefore, with the cycling trailer in the present invention being able to be attached to the cycle without the use of tools or additional parts, the cycling trailer can be easily transferred from one cycle to another without having to leave any attachments on the cycle.

In addition, the prior art cycling trailers do not provide a means for being locked to the cycle to prevent theft thereof.

When carrying a child, the cycling trailer must provide a safe positioning of the child so as to avoid injury in case of an accident. The child should be protected by the trailer in the case of a sliding type accident and the child should also be positioned so as to face toward the rear for maximum protection during a frontal crash.

The prior art trailer taught in U.S. Pat. No. 5,076,600 provides protection for a child in a sliding crash. However, it does not position the child so as to face toward the rear so to provide maximum protection during a frontal crash.

Preferably, the child carrying portion of the cycling trailer is removably coupled thereto so as to allow convenient conversion between the child carrying and cargo carrying functions.

When utilizing the cycling trailer for commuting functions it is often required to carry a change of clothes, specifically hanging type clothes. Thus, it is an advantage for the cycling trailer to conveniently transport hanging clothes in a protective enclosure, either on their own or in a garment carrying bag.

Finally, when utilizing a cycling trailer for touring or camping, it is often desirable to carry items, such as tents or bed rolls, that are too large to easily contain in a practically sized body enclosure. A means for carrying such items securely on top of the cycling trailer is provided for in the present invention.

Therefore, it is an object of the present invention to provide an improvement which overcomes the aforementioned inadequacies of the prior art cycling trailers and provides an improvement which is a significant contribution to the advancement of the cycling trailer art.

Another object of the present invention is to provide a lightweight aerodynamically shaped single wheeled cycling trailer with integral body enclosure for trailing behind a bicycle or motorcycle.

Another object of the present invention is to provide a cycling trailer that includes a body enclosure that serves as a main structural support member of the cycling trailer itself as well as for the support of any loads to be carried thereon.

Another object of the present invention is to provide a cycling trailer that includes a cover or lid which overlies the open top of the body enclosure so to provide the contents with protection from inclement weather and damage from debris.

Another object of the present invention is to provide a cycling trailer that includes a cover that is hinged to the body enclosure and that can be locked in the closed position so to prevent any of the cycling trailer's contents from being stolen.

Another object of the present invention is to provide a cycling trailer that includes a body enclosure having a horizontal ridge about its mid section to add structural stiffness and provide a resting place for a mid height interior shelf. The shelf thereby providing a means for separating the interior space of the body enclosure so as to prevent contained cargo from being crushed.

Another object of the present invention is to provide a cycling trailer that can be attached to a cycle without requiring permanent or semi-permanent attachment fixtures to be first attached to the cycle.

Another object of the present invention is to provide a cycling trailer that is attached to the seat post of a bicycle by way of a quick release latching mechanism that requires no tools for operation.

Another object of the present invention is to provide a cycling trailer that includes a latching mechanism that can be securely locked to the cycle, thereby, preventing an unauthorized removal.

Another object of the present invention is to provide a cycling trailer that includes a removable goose-neck tongue thereby facilitating the compact storage and shipment thereof.

Another object of the present invention is to provide a cycling trailer that includes an insertable child carrier for optional use therewith that serves to place the child in a rearwardly facing position within the body enclosure. When the insertable child carrier is not used with the cycling trailer, the cycling trailer takes on its cargo carrying configuration.

Another object of the present invention is to provide a cycling trailer that includes a hanging bar for optional use within the body enclosure equipped with a means for securing hanging articles, such as clothes, a garment bag or the like.

Another object of the present invention is to provide a cycling trailer that includes an optional tray type lid which overlies an open body enclosure. The tray type lid to be provided with an attached cargo net for use in transporting large items on the outside of the body enclosure.

Another object of the present invention is to provide a cycling trailer for use with a bicycle or motorcycle, the bicycle including a seat post to facilitate the coupling of said cycling trailer thereto, said cycling trailer comprising in combination: a body enclosure, said body enclosure being generally of an aerodynamic shape and having a forward surface, a lower surface and an open top; a frame means for supporting said body enclosure and coupling said body enclosure to the bicycle; a wheel, said wheel being coupled to said frame means so to facilitate the supporting of said body enclosure; and a latching universal joint, said latching universal joint being coupled to said frame means providing pivotal movement therein, said latching universal joint further being rigidly coupled to the seat post of the bicycle thereby facilitating the pulling of said cycling trailer behind the bicycle, whereby said latching universal joint is easily removable from the seat post without any need of tools and without having any necessary permanent or semi-permanent attachments left on the seat post of the bicycle.

These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purposes of summarizing the invention, the invention comprises a cycling trailer having a single wheel that is to be pulled behind a bicycle or motorcycle. More particularly, the cycling trailer is comprised of a molded one piece body enclosure, a frame means, a wheel and a latching universal joint. The latching universal joint allows for an easy quick release detaching of the cycling trailer from the bicycle. Additionally, the cycling trailer includes a child carrier that is removably coupled to the body enclosure for placing a child therein.

An important feature of the present invention is that the cycling trailer is a lightweight aerodynamically shaped single wheeled cycling trailer that includes an integral body enclosure for trailing behind a bicycle or motorcycle.

Another important feature of the present invention is that the cycling trailer includes a cover that is hinged to the body enclosure and can be locked in the closed position so to prevent any of the cycling trailer's contents from being stolen.

Another important feature of the present invention is that the cycling trailer can be attached to a bicycle without requiring the attachment of any permanent or semi-permanent fixtures to the bicycle first.

Another important feature of the present invention is that the cycling trailer attaches to the seat post of a bicycle by way of a quick release latching mechanism that requires no tools for operation.

Another important feature of the present invention is that the cycling trailer includes a latching universal joint that can be securely locked to the bicycle so to prevent any unauthorized removal.

Another important feature of the present invention is that the cycling trailer includes an insertable child carrier for optional use therewith that serves to place the child in a rearwardly facing position within the body enclosure. In the alternative, when the insertable child carrier is not used with the cycling trailer, the cycling trailer takes on a cargo carrying configuration.

Another important feature of the present invention is that the cycling trailer includes a hanging bar having elastic straps thereon for optional use within the body enclosure for securing hanging articles, such as clothes, a garment bag or the like.

The foregoing has outlined rather broadly, the more pertinent and prominent features of the present invention. The detailed description of the invention that follows is offered so that the present contribution to the art may be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other methods and structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

For a more succinct understanding of the nature and objects of the invention, reference should be directed to the following description taken in conjunction with the accompanying drawings in which.

Similar reference numerals refer to similar parts throughout the several figures.

DETAILED DESCRIPTION OF THE PREFERRED EMBODIMENT OF THE INVENTION

Figure 1:
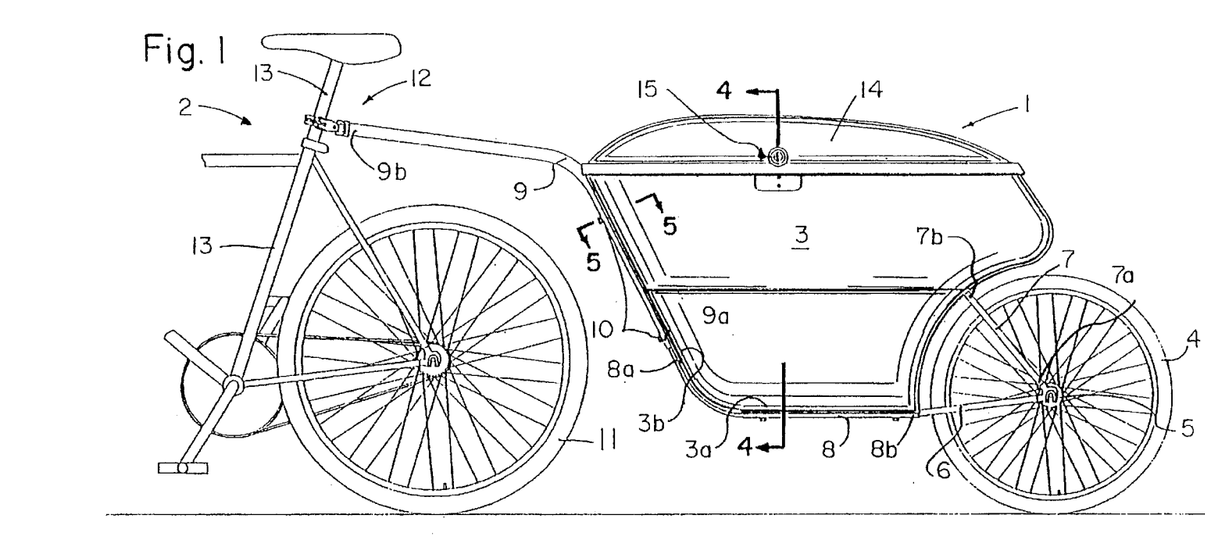
FIG. 1 is a left side view of the cycling trailer as seen in combination with a standard bicycle.

In now referring to FIG. 1, the cycling trailer 1 can be seen in combination with a standard bicycle 2. The cycling trailer 1 is comprised of a body enclosure 3 having a lower surface 3a, a forward surface 3b, a groove 3c and an open top 3d. The body enclosure 3 may be formed from commonly known materials such as sheet metal or plastic. It is preferable to construct the body enclosure 3 out of fiber reinforced plastic. The body enclosure 3, being of a rigid lightweight nature, is generally constructed so as to exhibit an aerodynamically efficient shape.

The wheel 4 of the cycling trailer 1, is coupled to and interposed between opposing dropouts 5. The opposing dropouts 5 are coupled to the rearward ends 6a of opposing wheel stays 6 and to the lower ends 7a of opposing inclined stays 7. The opposing inclined stays 7 are attached at their upper ends 7b to the body enclosure 3. This connection may be by way of bonding, riveting or preferably by bolting. The opposing wheel stays 6 are welded, bonded or brazed at their forward ends 6b to the second end 8b of the frame tube 8. The frame tube 8 extends along and is coupled to the lower surface 3a of the body enclosure 3. The coupling may be by way of bonding, riveting or preferably by bolting.

The frame tube 8 is received by a groove 3c in the lower surface 3a of the body enclosure 3. The first end 8a of the frame tube 8 runs along and is conformal with the body enclosure 3. The first end 8a of the frame tube 8 is coupled to the rearward end 9a of a goose-neck tongue 9. The goose-neck tongue 9 and first end 8a of the frame tube 8 run along and are conformal with the forward surface 3b of the body enclosure 3. The goose-neck tongue 9 and first end 8a of the frame tube 8 are coupled to the forward surface 3b of the body enclosure 3 in the same manner as the frame tube 8 is coupled to the lower surface 3a of the body enclosure 3.

The goose-neck tongue 9 extends forward from the body enclosure 3 over the rear wheel 11 of the bicycle 2. The forward end 9b of the goose neck tongue 9 is coupled to a latching universal joint 12. The latching allows the cycling trailer 1 to freely pivot about two orthogonal axis, one of which is parallel to the rear wheel 11 axis and one vertically oriented in the plane of the bicycle 2. The latching universal joint 12 is also used to secure the cycling trailer 1 to the seat post 13 of the bicycle 2. The latching universal joint 12 is secured to the bicycle 2 in such a way that no permanent or semi-permanent attachments are left when it is removed. The body enclosure 3 is provided with a lid 14 to cover the open top 3d. The lid 14 includes an integral locking means 15 to facilitate securing the body enclosure 3 in a locked state.

Figure 2:
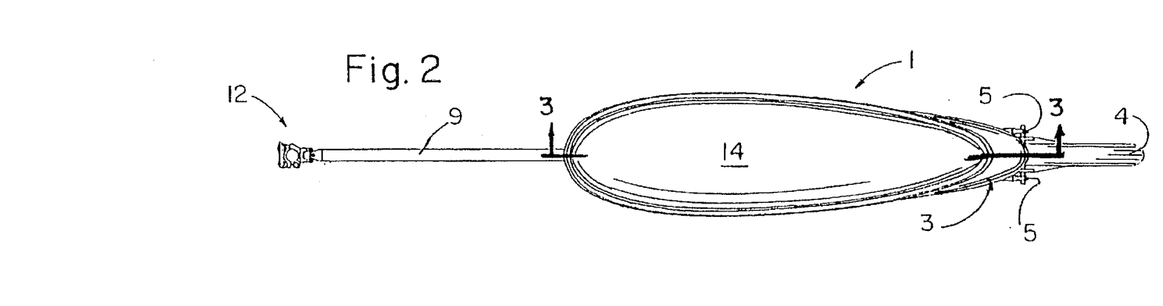
FIG. 2 is a top view of the cycling trailer showing its overall aerodynamic shape in conjunction with the lid overlying the body enclosure.

In referring to FIG. 2, a more detailed view of the overall aerodynamic shape of the cycling trailer 1 can be seen with the lid 14 overlying the body enclosure 3. The body enclosure 3, lid 14, goose-neck tongue 9 and wheel 4 are in alignment with and extend along the longitudinal center axis of the bicycle 2. The forward end 9b of the goose-neck tongue 9 is coupled to the latching universal joint 12 thereby securing the cycling trailer 1 to the seat post 13 of the bicycle 2.

Figure 3:
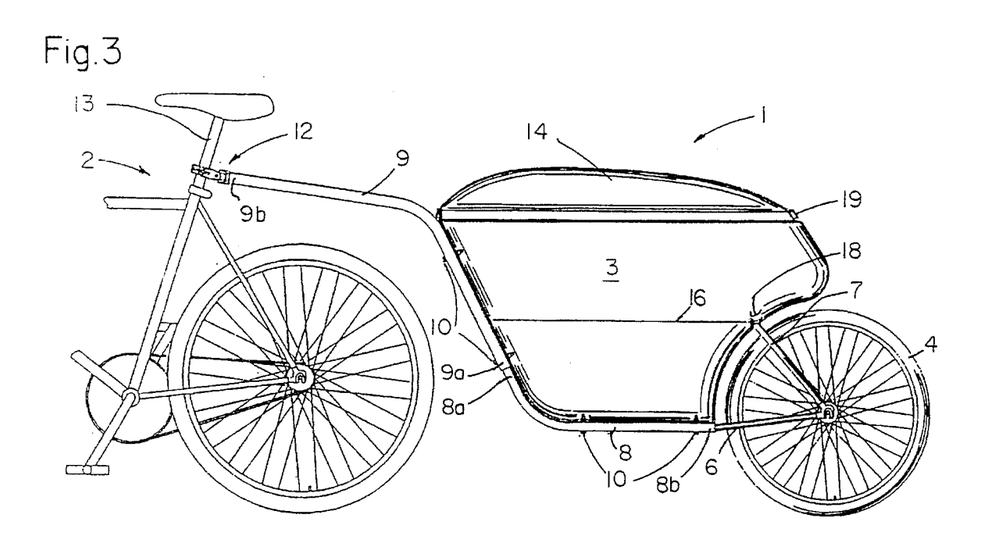
FIG. 3 is a left side view of the body enclosure and the lid sectioned along the line 3—3 in combination with the bicycle.

In now referring to FIG. 3, a left side view of the body enclosure 3 and lid 14 sectioned along the line 3—3 can be seen in combination with the bicycle 2. The lid 14 includes an overlapping rim 19 which fits over and around the open top 3d of the body enclosure 3. The body enclosure 3 is secured to the frame tube 8 along its lower surface 3a by way of standard bolts that extend through the lower frame tube and body enclosure 3. The body enclosure 3 is secured to the upper end 7b of the opposing inclined stays 7 at an anchoring point 18.

The rearward end 9a of the goose-neck tongue 9 fits over the first end 8a of the frame tube 8. Standard bolts are used to secure the rearward end 9a of the goose-neck tongue 9 to the frame tube 8 and simultaneously to the body enclosure 3. This configuration facilitates the removal of the goose-neck tongue 9 from the body enclosure 3 and the frame tube 8 to provide compact shipping and storage. With the body enclosure 3 secured to the lightweight goose-neck tongue 9 and frame tube 8 in this manner, the body enclosure 3 can carry the majority of the structural load.

Therefore, the cycling trailer 1 can be of a much lighter construction while not sacrificing any load carrying capability contrary to a fully framed trailer having an attached enclosure. Furthermore, the body enclosure 3 may be formed with a ridge 16 running along the mid-section that provides additional structural strength as well as serves as a resting ledge for an internal shelf. Preferably, for adding optimal strength, this ridge 16 is located at or near the level of the anchoring point 18 of the opposing inclined stays 7.

Figure 4:
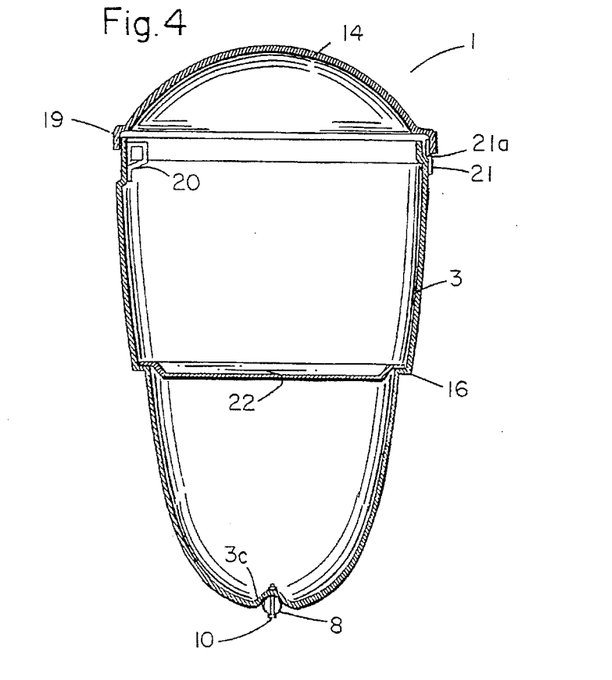
FIG. 4 is a cross-sectional view of the cycling trailer, body enclosure and lid taken along the line 4—4.

In now referring to FIG. 4, a cross-sectional view of the cycling trailer 1, body enclosure 3 and lid 14 can be seen in more detail along the line 4—4 as indicated in FIG. 1. The body enclosure 3 is shown to include the ridge 16 that provides additional structural rigidity to the body enclosure 3. The ridge 16 also serves as a resting place for an internal shelf 22. This internal shelf 22 acts to separate the cargo being carried in the cycling trailer 1. The internal shelf 22 may be made of plywood, metal plastic or most preferably fiber reinforced plastic.

More particularly, the frame tube 8 can be seen coupled along the lower surface 3a of the body enclosure 3 positioned in the groove 3c. The lid 14 covers the body enclosure 3 with an overlapping rim 19 that conformally fits around the open top 3d of the body enclosure 3. The lid 14 includes a means for coupling to the body enclosure 3. The lid 14 is pivotally coupled to the body enclosure 3 by way of a piano hinge 21. The piano hinge 21 includes a removable hinge pin 21a that cannot be removed when the lid 14 is closed. However, when the lid 14 is open, the hinge pin 21a and lid 14 can both be easily removed. Also, the body enclosure 3 is fitted with a strike plate 20 for engaging the integral locking means 15 located in the lid 14.

Figure 5:
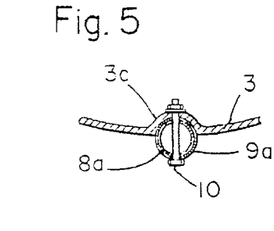
FIG. 5 is a detailed cross-sectional view of the point of coupling between the goose-neck tongue, the frame tube and the body enclosure taken along the line 5—5.

In referring to FIG. 5, a detailed cross-sectional view of the point of coupling between the goose-neck tongue 9, the frame tube 8 and the body enclosure 3 is shown taken along the line 5—5 as indicated in FIG. 1. The rearward end 9a of the goose-neck tongue 9 is slipped over the first end 8a of the frame tube 8. A standard bolt 10 is then passed through both the goose-neck tongue 9 and the frame tube 8 and further through the forward surface 3b of the body enclosure 3. The body enclosure 3 includes a groove 3c that receives the goose-neck tongue 9 and frame tube 8 tongue combination.

Figure 6:
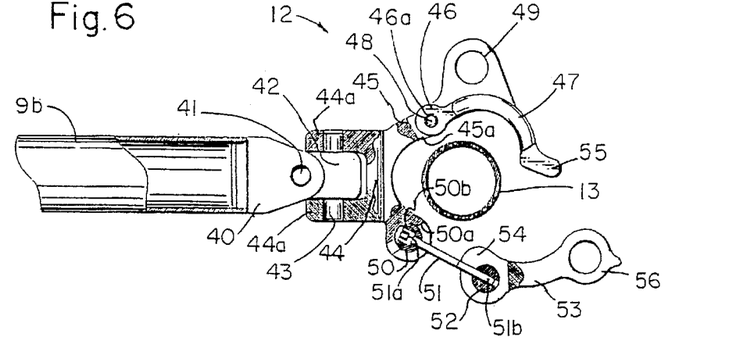
FIG. 6 is a top view of the latching universal joint having partial cross-sections illustrating its various components.

In now referring to FIG. 6, the latching universal joint 12 is shown in detail. The latching universal joint 12 is coupled to the forward end 9b of the goose-neck tongue 9 and latches to the seat post 13 of the bicycle 2. The latching universal joint 12 includes a yolk 40 which is inserted in and removably coupled to the forward end 9b of the goose-neck tongue 9. The coupling may be affected by bonding, riveting, bolting or most preferably by welding. The yolk 40 extends outward from the forward end 9b of the goose-neck tongue 9 and therein a vertical pivot pin 41 is journalled at its ends that pivots about a vertical axis.

The vertical pivot pin 41 is rigidly coupled at its center portion to a transfer block 42. The transfer block 42 further includes a horizontal pivot pin 43. The horizontal pivot pin 43 is positioned orthogonally to the vertical pivot pin 41. The horizontal pivot pin 43 is rigidly coupled at its center portion to the transfer block 42. The ends of the horizontal pivot pin 43 are journalled in the rearward projecting portions 44a of a rear latch plate 44.

It is obvious to one skilled in the art that the position of the pivot pins 41, 43 may be reversed and further that the center section of the pivot pins may be journalled. Further, a required condition for the proper operation of the universal section of the latching universal joint 12, is that the pivots be orthogonal and their pivot axis be generally perpendicular to the axis of a leaning bicycle 2 (that line connecting the ground contact positions of the forward and rear wheels). Therefore, the latching universal joint 12 provides a complete free movement of the cycling trailer 1 in relation to the bicycle 2.

The rear latch plate 44 is shaped in a curved fashion to conform to the seat post 13 of the bicycle 2. One side 45 of the rear latch plate 44 is slotted having a first extension 45a and a second extension 45b to receive the generally cylindrical end 46 of the forward latch plate 47. The forward latch plate 47 is pivotally coupled at its cylindrical end 46 to the one side 45 of the rear latch plate 44 by the use of a pivot pin 48. The pivot pin 48 is inserted through the first extension 45a of the one side 45, extends through a hole 46a in the cylindrical end 46 of the forward latch plate 47 and then rigidly fixed into a blind hole in the second extension 45b of the one side 45. This allows the forward latch plate 47 to freely rotate about a vertical axis relative to the rear latch plate 44.

Further, the rigidly fixed insertion of the pivot pin 48 into a blind hole prevents the removal thereof, thus reducing the likelihood of the pivot pin 48 being removed and the cycling trailer 1 being stolen. The forward latch plate 47 is shaped in a curved manner so as to conform to the seat post 13 of the bicycle 2 and further includes a locking loop 49. The opposite side 50a of the rear latch plate 44 includes a pivot cylinder 50 having a pivot axis generally parallel to the seat post 13. The pivot cylinder 50 has a single stepped diameter bore 50b perpendicular to its longitudinal axis.

A connecting bolt 51 having a head 51a is inserted through the single stepped diameter bore 50b of the pivot cylinder 50. The head 51a of the connecting bolt 51 is counter sunk in the single stepped diameter bore 50b. The connecting bolt 51 is inserted through the single stepped diameter bore 50b of the pivot cylinder 50 and passes through a slot in the opposite side 50a. By this arrangement, the pivot cylinder 50 and connecting bolt 51 can rotate freely about an axis parallel to the seat post 13 as positioned within the opposite side 50a. The connecting bolt 51, in extending through the slot in the opposite side 50a, prevents the pivot cylinder 50 from sliding out of the opposite side 50a.

The opposite end 51b of the connecting bolt 51 is threaded into the center of a cylindrical barrel nut 52 which has an axis generally parallel with the axis of the seat post 13. The barrel nut 52 is seated in the latching handle 53. The latching handle 53 includes a cam shaped end 54. This cam shaped end 54 has a central slot that the connecting bolt 51 passes through. The connecting bolt 51 acts to trap the barrel nut 52 from sliding out of the latching handle 53 while providing the latching handle 53 free rotation about the barrel nut 52. The cam shaped end 54 of the latching handle 53 is shaped such that, when the latching handle 53 is closed about the seat post 13, the cam shaped end 54 provides an over-center latching action when engaged with the slotted end 55 of the forward latch plate 47. The latching handle 53 is further provided with a lock loop 56.

Figure 7:
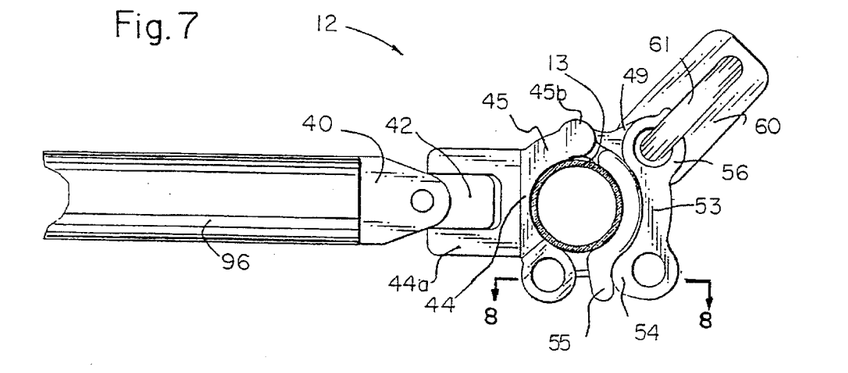
FIG. 7 is a top view of the latching universal joint in a closed and latched state around the seat post with a pad lock being utilized.

In referring now to FIG. 7, the latching universal joint 12 can be seen in a closed and latched state around the seat post 13. The forward latch plate 47 has been rotated about the cylindrical barrel nut 52 so to encircle the seat post 13. The cam shaped end 54 of the latching handle 53 frictionly engages the slotted end of the forward latch plate 47. The latching handle 53 is then latched by its over center action around the seat post 13. A pad lock 60 is shown locking the latch closed about the seat post 13 by passing the lock shank 61 through the lock loop 56 of the latching handle 53 and the lock loop 49 of the forward latch plate 47.

Figure 8:
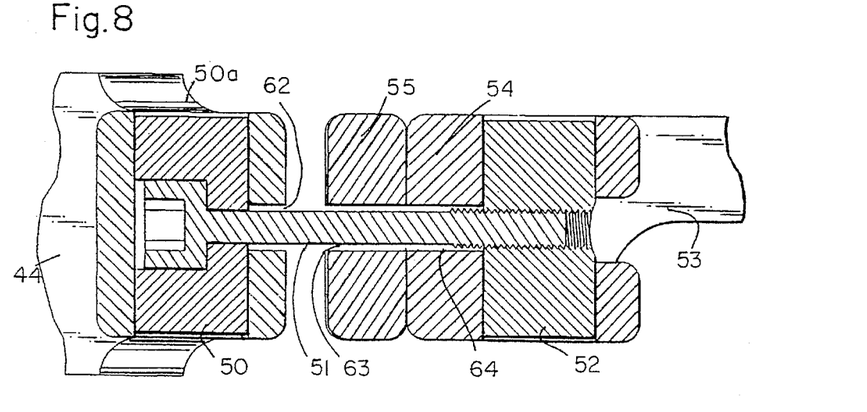
FIG. 8 is a detailed cross-sectional view taken along the line 8—8 showing the opposite side, the pivot cylinder, the connecting bolt, the slotted end of the forward latch plate, the cam shaped end of the latching handle and the cylindrical barrel nut in their relative positions when the latching universal joint is latched in a closed state.

In referring to FIG. 8, a detailed cross-sectional view taken along the line 8—8 of the opposite side 50a, the pivot cylinder 50, the connecting bolt 51, the slotted end 55 of the forward latch plate 47, the cam shaped end 54 of the latching handle 53 and the cylindrical barrel nut 52 in their relative positions when latched in a closed state. The pivot cylinder 50 is shown held by the opposite end 50a of the rear latch plate 44. The connecting bolt 51 is drilled and its head counter sunk perpendicular to the longitudinal axis of the pivot cylinder 50. The connecting bolt 51 is inserted through the single stepped diameter bore 50b of the pivot cylinder 50. The connecting bolt 51 passes through a slot 62 in the opposite end 50a of the rear latch plate 44 thereby trapping the pivot cylinder therein.

In the latched position, the connecting bolt 51 passes through a slot 63 in the slotted end 55 of the forward latch plate 47. The connecting bolt 51 further passes through a slot 64 in the cam shaped end 54 of the latching handle 53. The connecting bolt 51 is threadingly engaged with the cylindrical barrel nut 52 that is positioned in the cam shaped end 54 of the latching handle 53. By adjusting the position of the connecting bolt in the barrel nut the tension in the clamping action and overall size of the latch closure can be adjusted to conform to varying sizes of seat posts 13.

Figures 9, 10, 11:
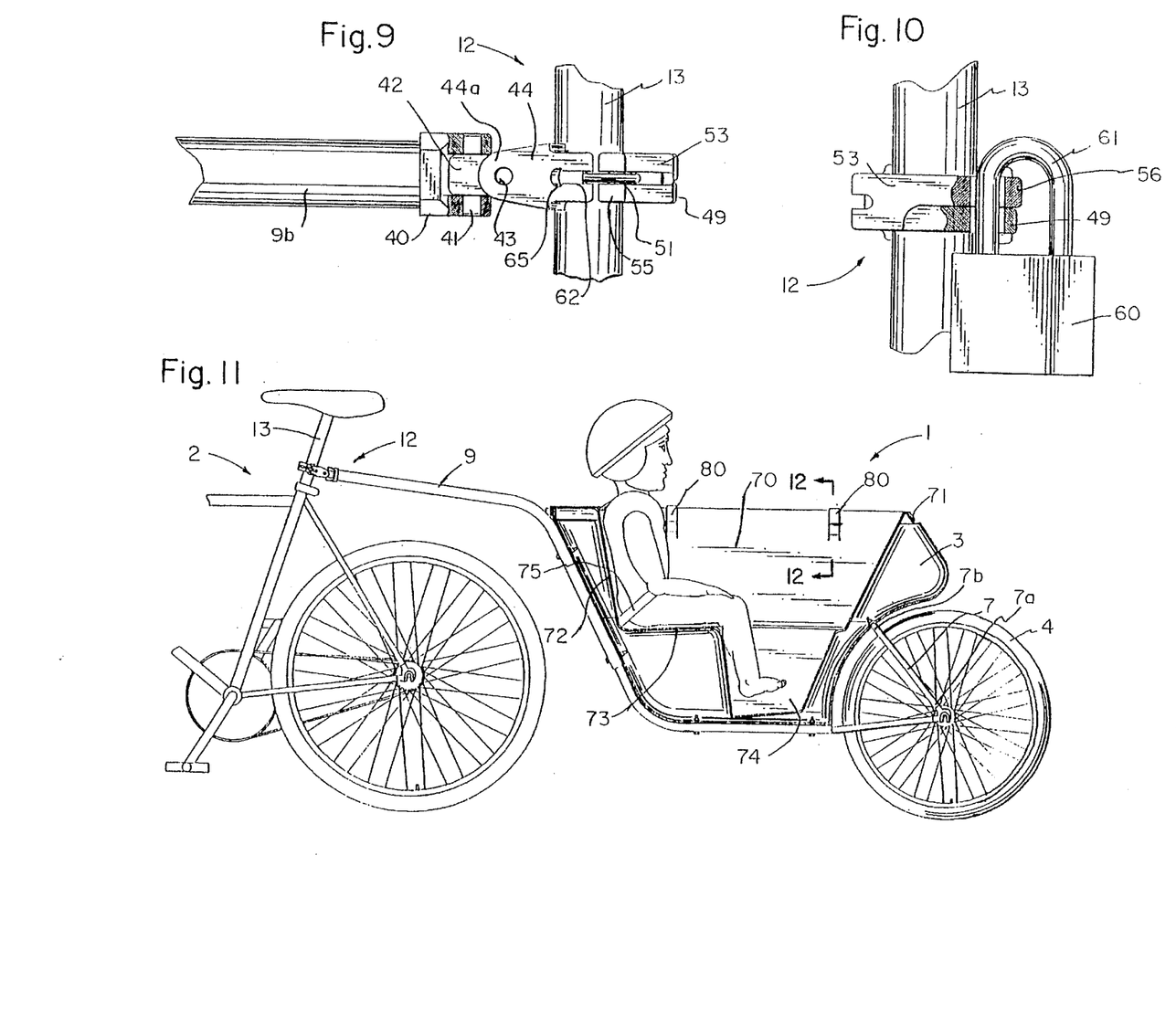
FIG. 9 is a side cross-sectional view of the yolk illustrating the positioning of the transfer block therein with the latching universal joint latched around the seat post.
FIG. 10 is a rearward facing cross-sectional view of the latching universal joint closed around the seat post with the pad lock locked in position.
FIG. 11 is a cross-sectional view of the child carrier and body enclosure of the cycling trailer in their relative positions illustrating a child placed therein.

In referring to FIG. 9, a side cross-sectional view of the yolk 40 is shown with the latching universal joint 12 latched around the seat post 13. The yolk 40 is shown to have the ends of the vertical pivot pin 41 journalled therein. The center section of the pivot pin 41 is fixed in the transfer block 42. The slot 62 in the opposite end 50a of the rear latch plate 44 is shown to have an enlarged clearance hole 65. This clearance hole 65 facilitates the passing of the head 51a of the connecting bolt 51 on assembly. The clearance hole 65 is positioned such that when the latch is closed the head 51a of the connecting bolt 51 is inaccessible, preventing disassembly of the latch to defeat the lock.

In referring to FIG. 10, a rearward facing cross-sectional view of the latching universal joint 12 closed around the seat post 13 is shown with the pad lock 60 locked in position. The lock loop 56 of the latching handle 53 is shown to overlie the locking loop 49 of the forward latch plate 47. This allows the shank 61 of the pad lock 60 to be inserted through both loops thereby facilitating the locked securement of the cycling trailer 1 to the seat post 13 of the bicycle 2.

In referring to FIG. 11, a removable child carrier 70 is shown as positioned in the body enclosure 3. The child carrier 70 is in the general form of a molded upwardly open container that fits inside the body enclosure 3. The child carrier 70 can be made of metal, molded plastic or preferably fiber reinforced plastic.

The child carrier 70 is supported in the body enclosure 3 by an overlapping lip 71 that engages with the upper perimeter 83 of the body enclosure 3. The child carrier 70 serves to hold a small child in a rear facing seated position. The child carrier 70 includes a seat back 72 and a seat bottom 73. The seat back 72 is positioned near the mid-height of the body enclosure 3. The seat bottom 73 is positioned so as to place the child substantially inside the body enclosure 3. It is preferred to have the child positioned such that his/her shoulders are below the upper perimeter 83 of the body enclosure 3 thereby preventing the child from placing their arms on the outside of the body enclosure 3.

The child carrier 70 also includes a foot well 74 and a safety belt 75 for securing the child around the seat, shoulders and groin areas. The safety belt 75 is of the standard type safety belts that are widely used today made of webbing material and have quick release buckles. The safety belt 75 extends around the outside of the child carrier 70 via holes therein and re-emerges to be continuously joined with itself on the inside of the child carrier 70. Thus, there is no requirement to permanently connect the safety belt 75 to the child carrier 70.

In addition, the child carrier 70 is rigidly secured to the body enclosure 3 to prevent the child carrier 70 from inadvertently detaching from the body enclosure 3 during an accident. The securement thereof can be made by way of standard bolts or the like. However, it is preferable that the child carrier 70 is held in the body enclosure 3 by way of integrally molded quick release latches 80. It is preferred to have four quick release latches 80, two on each side, distributed around the overlapping lip 71 of the child carrier 70. These quick release latches 80 interlock with the upper perimeter 83 of the body enclosure 3.

Figure 12:
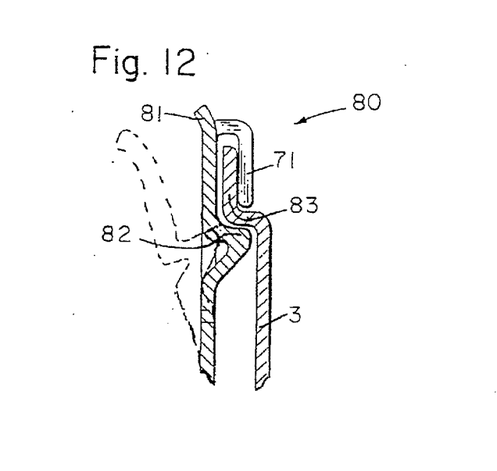
FIG. 12 is a cross-sectional view of the quick release latches taken along line 12—12 illustrating manner of coupling with the body enclosure.

In referring now to FIG. 12, a cross-sectional view taken along line 12—12, as indicated in FIG. 11, can be seen of the quick release latches 80. The quick release latches 80 interlock with the upper perimeter 83 of the body enclosure 3. The quick release latches 80 are formed with a thumb push area 81 and a latching protrusion 82. The latching protrusion 82 is generally flat on its upper surface and tapped on its lower surface. In this form, the child carrier 70 with quick release latches 80 can be securely pressed into the body enclosure 3.

When inserting the child carrier 70, the tapered surface of the latching protrusion 82 forces the quick release latch 80 open until the child carrier 70 is fully inserted. After the child carrier 70 is fully inserted, the quick release latches 80 are snapped closed under the upper perimeter 83 of the body enclosure 3. Conversely, to then open the quick release latches 80, a person must press on the thumb press area 81 bending the quick release latch 80 back so that the latching protrusion 82 clears the upper perimeter 83 of the body enclosure 3.

Figure 13:
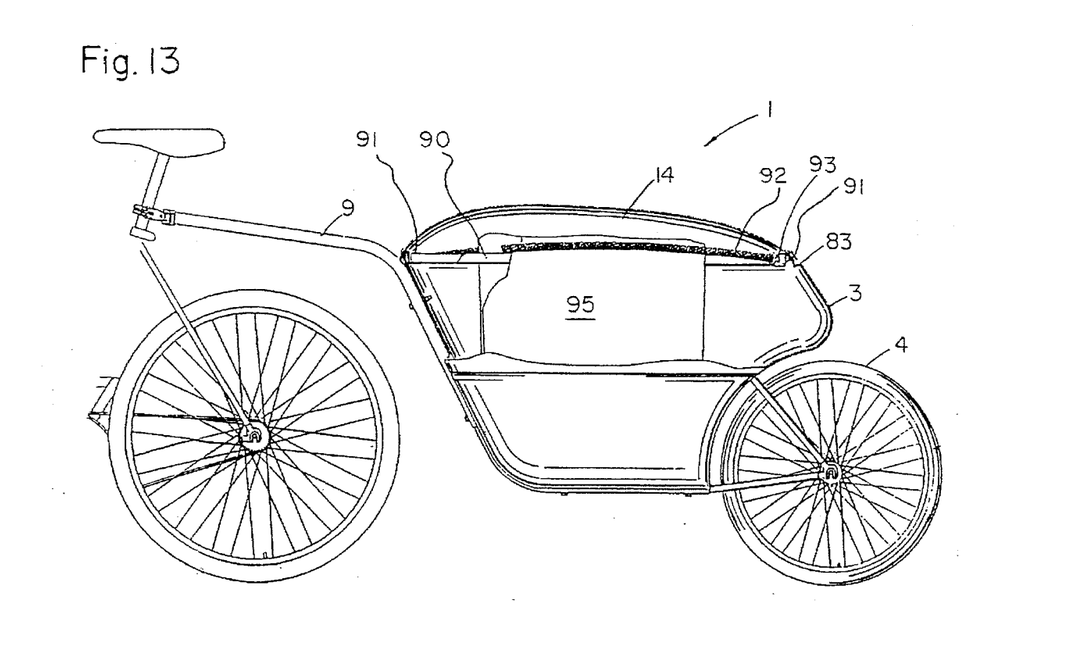
FIG. 13 is a partial left side cross-sectional view of the cycling trailer illustrating the placement of the hanging bar and the elastic straps in the body enclosure.

In referring to FIG. 13, a partial left side cross-sectional view of the cycling trailer 1 is shown having a removable hanging bar 90 installed. The hanging bar 90 is installed in alignment with the longitudinal axis of the body enclosure 3 and is supported at its ends by fasteners 91 that interlock over the upper perimeter 83 of the body enclosure 3. The hanging bar 90 facilitates the hanging of clothes 95 or a garment carrying bag thereon. Elastic straps 92 are included to prevent the clothes 95 from sliding off the hanging bar 90 during use. The elastic straps 92 include end fittings 93 that interlock with the fasteners 91 to provide easy connection and disconnection over the clothing 95. The hanging bar 90 and fasteners 91 are formed such that they may be used concurrently with the overlying lid 14 thereby providing a weather protected lockable compartment for the load.

Figure 14:
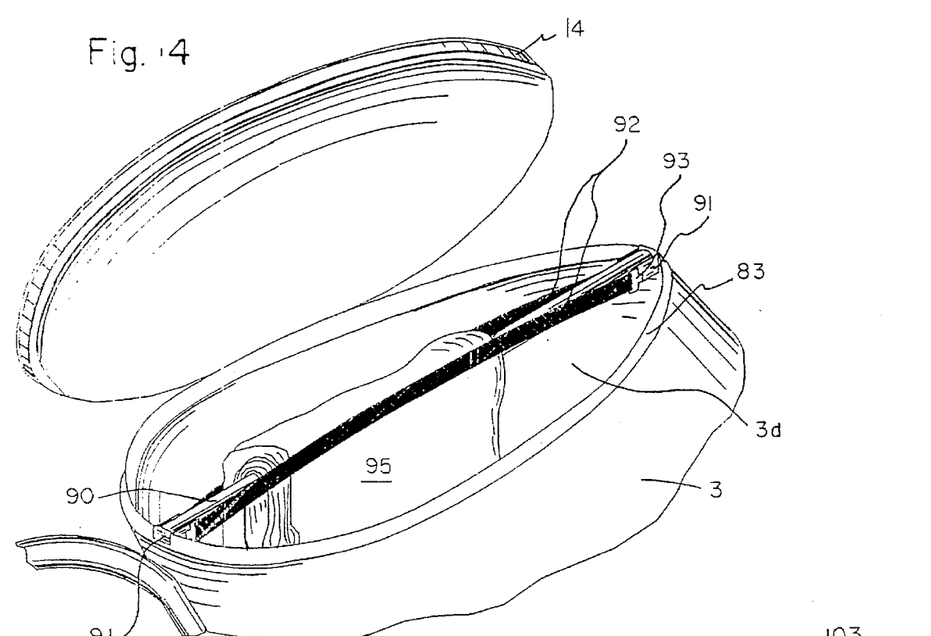
FIG. 14 is a top view of the body enclosure in combination with the lid in an open state illustrating the hanging bar in greater detail as installed to support clothes therein.

In further describing the hanging bar 90, refer now to FIG. 14 where a top view of the body enclosure 3 with the lid 14 in the open position shows the hanging bar 90 installed and supporting clothes 95. The fasteners 91 are shown supporting the hanging bar 90 and the elastic straps 92 are shown in position securing the clothes 95. The elastic straps 92 are shown being held in place by the end fittings 93.

Figure 15:
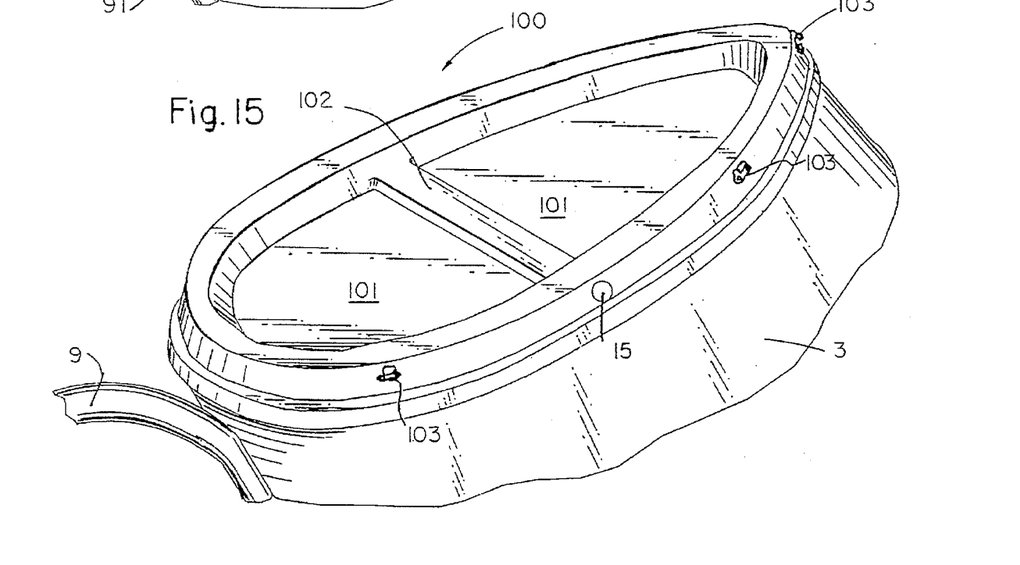
FIG. 15 is a top view of the tray lid being used in conjunction with the body enclosure showing the positioning of the strengthening rib and the tie down clips.

In referring now to FIG. 15, a top view of a tray lid 100 being used in conjunction with the body enclosure 3 is shown. The tray lid 100 covers the open top 3d of the body enclosure 3 in a manner similar to lid 14 as shown in the previous Figures. The tray lid 100 has a generally flat bottom surface 101 and a strengthening rib 102 that is approximately positioned in the center thereof. The tray type lid 100 further includes tie down clips 103 positioned about its perimeter to facilitate the securing of cargo on top of the tray lid 100.

The present invention includes that contained in the appended claims as well as that of the foregoing description. Although this description has been described in its preferred form with a certain degree of particularity, it should be understood that the present disclosure of the preferred form has been made only by way of example and that numerous changes in the details of construction, combination, or arrangement of parts thereof may be resorted to without departing from the spirit and scope of the invention.

Now that the invention has been described,
What is claimed is:

1. A cycling trailer for use with a bicycle or cycle, the bicycle including a seat post to facilitate the coupling of said cycling trailer thereto, said cycling trailer comprising in combination:

a body enclosure;

a frame means for supporting said body enclosure and coupling said body enclosure to the bicycle;

a wheel, said wheel being coupled to said frame means so as to facilitate the supporting of said body enclosure; and a latching universal joint, said latching universal joint being coupled to said frame means providing pivotal movement therein, said latching universal joint further including a quick latch means for quick releaseable coupling of said latching universal joint to the seat post of the bicycle thereby facilitating the pulling of said cycling trailer behind the bicycle, wherein said quick latch means is comprised of a latching handle having a cam shaped end and a forward latch plate, said latching handle and said forward latch plate being respectively coupled relative to said latching universal joint, whereby said cam shaped end is positioned so as to frictionally engage said forward latch plate to thereby encompass the seat post and forcibly secure said latching universal joint thereto, said cam shaped end on said latching handle having the ability to be quickly released from said forward latch plate, whereby said latching universal joint is quickly removable from the seat post without any need of tools and without having any necessary permanent or semi-permanent attachments left on the seat post of the bicycle.

2. The cycling trailer as recited in claim 1, wherein said latching universal joint is comprised of a yolk, a rear latch plate having one side and an opposite side, a forward latch plate, a latching handle and a connecting bolt having a head and a threaded end, said yolk being rigidly coupled to said frame means and pivotally coupled to said rear latch plate thereby facilitating the free movement of said frame means relative to said rear latch plate, said forward latch plate being hingedly coupled to said one side of said rear latch plate and said connecting bolt being hingedly coupled to said opposite side of said rear latch plate, said threaded end of said connecting bolt being coupled to said latching handle, whereby said rear latch plate, said forward latch plate and said latching handle aggregately act so to surround the seat post of the bicycle and securely couple said cycling trailer thereto.

3. The cycling trailer as recited in claim 1, wherein said latching universal joint further includes a latch locking means for locking said cycling trailer to the bicycle whereby said cycling trailer is secured and protected from theft.

4. The cycling trailer as recited in claim 3, wherein said latch locking means further includes a locking loop integrally extending from said forward latch plate and a lock loop integrally extending from said latching handle, whereby said locking loop and said lock loop align when said latching universal joint is secured to the seat post, the alignment of said locking loop and said lock loop facilitating a pad lock passing therethrough.

5. The cycling trailer as recited in claim 3, wherein said body enclosure has a forward surface and a lower surface, and said frame means is comprised of a goose-neck tongue having a rearward end and a forward end and a frame tube having a first end and a second end, said rearward end of said goose-neck tongue being removably coupled to said first end of said frame tube, said frame tube and said goose-neck tongue being coupled to said lower surface and said forward surface of said body enclosure to facilitate the supporting thereof.

6. The cycling trailer as recited in claim 5, wherein said body enclosure further includes a groove positioned on said lower and forward surfaces to receive said frame tube and said goose-neck tongue when being coupled thereto.

7. The cycling trailer as recited in claim 6, wherein said body enclosure further includes an open top and a lid, said lid being coupled to and covering said open top of said body enclosure to thereby completely enclose said cycling trailer protecting contents from inclement weather.

8. The cycling trailer as recited in claim 7, wherein said lid further includes an integral locking means to facilitate securing said lid in a locked state.

9. The cycling trailer as recited in claim 8, wherein said body enclosure further includes a hanging bar removably coupled thereto, said hanging bar extending across said open top and facilitating the hanging of cargo thereover, said hanging bar including elastic straps extending along therewith and coupled thereto for securing hanging cargo.

10. The cycling trailer as recited in claim 8, wherein said body enclosure includes a child carrier having an integral seat back, an integral seat bottom and an integral foot well, said child carrier being removably coupled to said body enclosure, whereby a child is positioned so to face in a rearwardly direction and is primarily contained within.

11. The cycling trailer as recited in claim 10, wherein said child carrier further includes a quick release latching means for quick removable coupling of said child carrier to said body enclosure.

12. The cycling trailer as recited in claim 11, wherein said child carrier further includes a seat belt coupled to said seat bottom and said seat back, whereby said seat belt facilitates the securement of the child therein.

13. The cycling trailer as recited in claim 9, wherein said lid has a tray type shape having tie down clips positioned thereabout providing for the securing and carrying of cargo thereon.

14. The cycling trailer as recited in claim 1, wherein said body enclosure is structural and enhances the structural integrity of said frame means.

* * * * *